United States Patent
Homsey

(10) Patent No.: US 6,708,004 B1
(45) Date of Patent: Mar. 16, 2004

(54) METHOD AND APPARATUS FOR REDUCING CROSSTALK BETWEEN A MONITORING CHANNEL AND A DATA CHANNEL IN A WDM OPTICAL COMMUNICATION SYSTEM

(75) Inventor: Glen Mitchell Homsey, Red Bank, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 09/204,043

(22) Filed: Dec. 1, 1998

(51) Int. Cl.⁷ .............................................. H04B 10/02
(52) U.S. Cl. ......................... 398/177; 398/9; 398/11; 398/18; 398/33; 398/178; 398/173; 398/180; 398/181; 359/73.1
(58) Field of Search ................. 398/9, 11, 18, 398/33, 177, 181, 173, 178, 180; 356/73.1

(56) References Cited

U.S. PATENT DOCUMENTS

| | | | |
|---|---|---|---|
| 4,586,186 A | 4/1986 | Anderson | 375/3 |
| 4,633,464 A | 12/1986 | Anderson | 370/111 |
| 5,296,957 A * | 3/1994 | Takahashi et al. | 359/177 |
| 5,436,746 A * | 7/1995 | Hirst | 359/110 |
| 5,539,557 A | 7/1996 | Horiuchi et al. | 359/110 |
| 5,737,105 A * | 4/1998 | Ohta et al. | 359/179 |
| 5,790,294 A | 8/1998 | Horiuchi et al. | 359/177 |
| 5,825,515 A | 10/1998 | Anderson | 359/110 |
| 5,898,502 A | 4/1999 | Horiuchi et al. | 356/416 |
| 5,926,263 A * | 7/1999 | Lynch et al. | 356/73.1 |
| 5,969,833 A * | 10/1999 | Jensen | 359/110 |
| 5,995,254 A * | 11/1999 | Koga et al. | 359/124 |
| 6,014,481 A * | 1/2000 | Kremers | 385/24 |
| 6,028,684 A * | 2/2000 | Kidorf | 359/110 |
| 6,134,032 A * | 10/2000 | Kram et al. | 359/110 |
| 6,185,020 B1 | 2/2001 | Horiuchi et al. | 359/110 |
| 6,201,599 B1 | 3/2001 | Ryu et al. | 356/73.1 |
| 6,211,985 B1 * | 4/2001 | Anderson | 359/174 |
| 6,301,036 B1 * | 10/2001 | Spencer | 359/179 |
| 6,323,981 B1 * | 11/2001 | Jensen | 359/177 |
| 6,327,250 B1 * | 12/2001 | Chen et al. | 370/241 |
| 6,414,775 B1 * | 7/2002 | Pederson | 359/177 |
| 6,452,701 B1 * | 9/2002 | Terahara et al. | 359/110 |

* cited by examiner

*Primary Examiner*—Leslie Pascal
*Assistant Examiner*—Hanh Phan

(57) ABSTRACT

An optical communication system is provided that includes first and second optical transmitters/receivers remotely located with respect to one another and which are coupled together by first and second optical transmission paths for bidirectionally transmitting optical information therebetween. First and second optical amplifiers are respectively disposed in the first and second optical transmission paths. At least one loop-back path optically couples a portion of a WDM optical signal from the first to the second transmission path. The loop-back path includes a filter for transmitting a monitoring channel but not a data channel included in the optical signal portion traversing the loop-back path.

54 Claims, 2 Drawing Sheets

METHOD AND APPARATUS FOR REDUCING CROSSTALK BETWEEN A MONITORING CHANNEL AND A DATA CHANNEL IN A WDM OPTICAL COMMUNICATION SYSTEM

FIELD OF THE INVENTION

The present invention relates to an optical communication system and more particularly to a system for monitoring an optical communication system.

BACKGROUND OF THE INVENTION

In long distance fiber optic communication systems it is important to monitor the health of the system. For example, monitoring can be used to detect faults or breaks in the fiber optic cable, faulty repeaters or amplifiers or other problems with the system.

Prior art monitoring techniques include the use of a testing system which generates a monitoring signal and modulating the monitoring signal onto a single channel (or wavelength) with the transmitted data signal. For example, the data signal may be amplitude modulated by the monitoring signal. A loop-back coupler within an optical amplifier pair or repeater located downstream is used to return a portion of the transmitted signal (data signal plus monitoring signal modulation) to the testing system. The testing system then separates the monitoring signal from the data signal and processes the monitoring signal to examine the health of the transmission system. U.S. Pat. Nos. 4,586,186 and 4,633,464 C. Anderson et al. disclose a similar technique to modulate monitoring response information from a repeater onto the main data signal to monitor the health of the system.

Optical time domain reflectometry (OTDR) is another technique used to remotely detect faults in optical communication systems. In OTDR, an optical pulse is launched into an optical fiber and backscattered signals returning to the launch end are monitored. In the event that there are discontinuities such as faults or splices in the fiber, the amount of backscattering generally changes and such change is detected in the monitored signals. Since backscattering and reflection also occur from elements such as couplers, the monitored signals are usually compared with a reference record, new peaks and other changes in the monitored signal level being indicative of changes in the fiber path, normally indicating a fault. The time between pulse launch and receipt of a backscattered signal is proportional to the distance along the fiber to the source of the backscattering, thus allowing the fault to be located. In a wavelength division multiplexing (WDM) system, one wavelength is usually assigned as the OTDR channel.

Typically, line monitoring equipment (LME) detecting a returned portion of the transmission signal is employed when the transmission system is in-service and OTDR is employed when the system is out-of-service. Therefore, crosstalk between the OTDR channel and the data channels is not a concern. Since the line monitoring equipment is used in-service, however, crosstalk is a concern in this case. Specifically, crosstalk arises between the returning portion of the signal and the data channels traveling on the opposite-going transmission path.

Accordingly, it would be desirable to provide line monitoring equipment for an optical transmission system that reduces crosstalk between the data channels and the returning portion of the signal that is to be monitored.

SUMMARY OF THE INVENTION

In accordance with the present invention, an optical communication system is provided that includes first and second optical transmitters/receivers remotely located with respect to one another and which are coupled together by first and second optical transmission paths for bidirectionally transmitting optical information therebetween. First and second optical amplifiers are respectively disposed in the first and second optical transmission paths. At least one loop-back path optically couples a portion of a WDM optical signal from the first to the second transmission path. The loop-back path includes a filter for transmitting a monitoring channel but not a data channel included in the optical signal portion traversing the loop-back path.

The loop-back path may include first and second optical couplers disposed in the first and second transmission paths, respectively. In one particular embodiment of the invention, the transmission system also includes an OTDR path for coupling a backscattered signal from the first to the second transmission path. In this embodiment, the loopback path and the OTDR path overlap at least in part and the first and second couplers further couple the backscattered signal from the first to the second transmission path.

In another embodiment of the invention, the WDM optical signal includes a plurality of data channels that occupy a given data bandwidth and the monitoring channel is located at a wavelength outside of the given data bandwidth. In some cases the monitoring channel is located at a wavelength below the given data bandwidth, or alternatively, above the given data bandwidth.

In accordance with another aspect of the invention, a method is provided for monitoring an optical communication system that includes first and second optical transmission paths coupling a first transmitter/receiver to a second transmitter/receiver for bidirectionally transmitting optical information therebetween. The first and second optical transmission paths respectively include first and second optical amplifiers. In accordance with the method, a WDM signal is first transmitted. The WDM signal includes a monitoring channel and at least one data channel through the first optical transmission path. Next, a portion of the WDM optical signal is coupled from the first transmission path and filtered so that the monitoring channel but not the data channel is transmitted. The filtered portion of the WDM optical signal is coupled to the second transmission path. Finally, the monitoring channel is detected to access the status of the transmission system.

DETAILED DESCRIPTION

Figure 1:
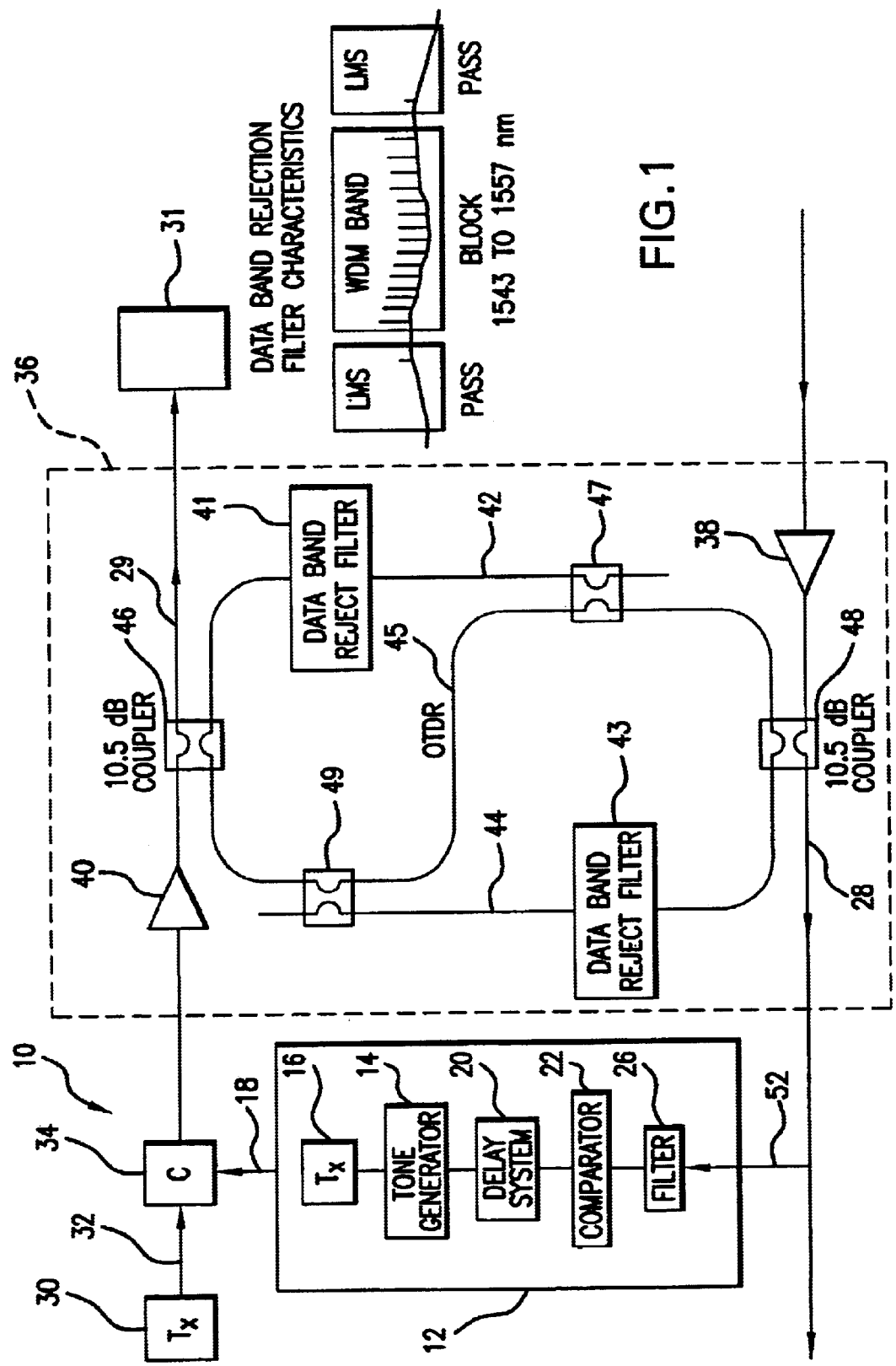
FIG. 1 illustrates an optical transmission system having a monitoring system in accordance with the present invention.

FIG. 1 illustrates a monitoring system 10 in accordance with the present invention. Monitoring system 10 includes (LME) 12 for monitoring the health of a telecommunications transmission system, such as a fiber optic transmission system. LME 12 includes pseudo-random sequence (PRS) tone generator 14 connected to laser transmitter 16 for generating and outputting a PRS used to modulate a tone. Laser transmitter 16 generates a low level AM signal 18 on the data signal based on the tones generated by PRS tone generator 14.

LME 12 also includes a delay system 20 connected to PRS tone generator 14 for delaying the tones received from PRS tone generator 14. LME 12 further includes an optical filter 26 for selectively passing one or more wavelengths or channels, while blocking the transmission of other wavelengths.

Comparator/correlator 22 is connected to delay system 20 and optical filter 26. Comparator/correlator 22 correlates the outputs of optical filter 26 and delay system 20 using well known digital signal processing techniques. Comparator/correlator 22 outputs a result of the correlation operation, which is used by a computer or other systems (not shown) to diagnose faults or problems in the optical transmission system.

LME 12 is connected to a portion of an optical transmission system. The optical transmission system includes a laser transmitter 30 and an optical fiber pair, including fibers 28 and 29, for carrying optical signals. Fibers 28 and 29 can be the long distance optical fiber lines for deployment, for example, under the ocean. Optical fibers 28 and 29 are unidirectional fibers and carry signals in opposite directions. Fibers 28 and 29 together provide a bi-directional path for transmitting signals. While the monitoring system according to a disclosed embodiment of the present invention monitors a transmission system that includes two unidirectional fibers 28 and 29, the present invention may be used to monitor transmission systems employing a single bi-directional fiber.

Laser transmitter 30 transmits optical data on a plurality of channels (or wavelengths) over fiber 29. Laser transmitter 30 can comprise a plurality of laser transmitters each transmitting an optical data signal over fiber 29 using a different channel or wavelength. A plurality of data signals each at a different wavelength are sent over fiber 29 using wavelength division multiplexing (WDM). Alternatively, only a single channel of data may be carried on fiber 29. Similarly WDM data signals may be carried over fiber 28, but traveling in a direction opposite of those signals on fiber 29. A coupler 34 combines the WDM data 32 from transmitter 30 and the LME tone 18 from transmitter 16 and outputs this combined signal for transmission onto fiber 29. A first optical repeater 36 receives the combined signal from coupler 34. Repeater 36 includes amplifiers 38 and 40 for amplifying optical signals transmitted over fiber 28 and 29, respectively. Repeater 36 also includes a loop-back path 42, which returns a portion of the signal being transmitted on fiber 29 to fiber 28 (via high loss couplers 46 and 48) for transmission to LME 12. Similarly, repeater 36 includes a loop-back path 44, which returns a portion of the signal being transmitted on fiber 28 to fiber 29 (via high loss couplers 48 and 46) to an LME (not shown) located at the receiver terminal along fiber 29. If, as in FIG. 1, an OTDR path is also employed (discussed below), loop-back paths 42 and 44 may traverse a portion of the OTDR path via additional couplers 47 and 49, respectively. In this way only a single coupler is required in each of the transmission paths 28 and 29. Specifically, coupler 49 receives both the OTDR signal and the LME tone from optical fiber 28. Likewise, coupler 47 receives both the OTDR signal and the LME tone from optical fiber 29. Additional optical repeaters (not shown), including their associated loop-back couplers, may be connected to fibers 28 and 29 for periodically amplifying and returning signals thereon.

Signal 52 arrives at the end of fiber 28 and carries all signals present on fiber 28, including the combined WDM data 32 and the amplitude modulated tones 18 returned by loop-back path 42. Signal 52 is input to optical filter 26. Optical filter 26 is wavelength selective and passes only the wavelength of LME tone 18. Comparator/correlator 22 then correlates the returned LME tone with the delayed PRS tones. Comparator/correlator 22 may correlate electrical signals or optical signals. Where comparator/correlator 22 correlates electrical signals, LME 12 further includes an optical decoder connected between optical filter 26 and the comparator/correlator 22 for converting the optical signals output by filter 26 into electrical signals.

Comparator/correlator 22 correlates the PRS tones output by the PRS tone generator 14 with each of the returned LME tones. To perform this correlation, delay system 20 receives the PRS tones from the PRS tone generator 14 and outputs a plurality of delayed PRS tones to comparator/correlator 22. Delay system 20 outputs each PRS tone after the time delays corresponding to each repeater. In other words, delay system 20 delays the PRS tones based on the location of each repeater. This process is repeated for each PRS tone received by the delay system 20. Comparator/correlator 22 compares or correlates the delayed LME tone returned from each repeater with correspondingly delayed PRS tones generated by PRS tone generator 14.

As previously mentioned, LME tone 18 is typically generated within the bandwidth of the data channels. To avoid the adverse effects of noise caused by the LME tone 18, the present invention employs an LME tone that is outside the bandwidth of the data channels. For example, if the data channels occupy a bandwidth between 1543 and 1557 nm, the LME tone will be located at a wavelength greater than 1557 nm or less than 1543 nm. As shown in FIG. 1, filter 41 is inserted in loopback path 42 to selectively remove the data channels so that only the LME tone is transmitted. That is, the filter 41 has a passband centered about the LME tone and a stop band centered about the data channels. By ensuring that the returned signal only includes the LME tone 18 and not the data channels, the filter 41 effectively eliminates crosstalk that may occur between the returned signal and the data signal directed along fiber 28.

Similar to filter 41 employed in loop-back path 42, the present invention provides a filter 43 located in loop-back path 44. Like filter 41, filter 43 has a passband centered about the LME tone and a stop band centered about the data channels. Filter 43 eliminates cross-talk between the returned signal and the data signal directed along fiber 29.

Referring again to FIG. 1, repeater 36 includes an OTDR path 45 through which a portion of the signal reflected by Rayleigh scattering may be tapped and returned along the opposite-traveling fiber path so that OTDR may be performed. Because couplers 46 and 48 are located at the outputs of (i.e., downstream from) optical amplifiers 40 and 38, respectively, the backscattered signal is coupled to the opposite-going fiber before undergoing amplification in the optical amplifiers. In operation, a portion of the backscattered signal traveling along optical fiber 29 is coupled to optical path 28 via OTDR path 45 and returned to terminal 30 where OTDR may be performed. Similarly, a portion of the backscattered signal along optical fiber 28 is coupled to optical path 29 via OTDR path 45 and returned to terminal 31.

Figure 2:
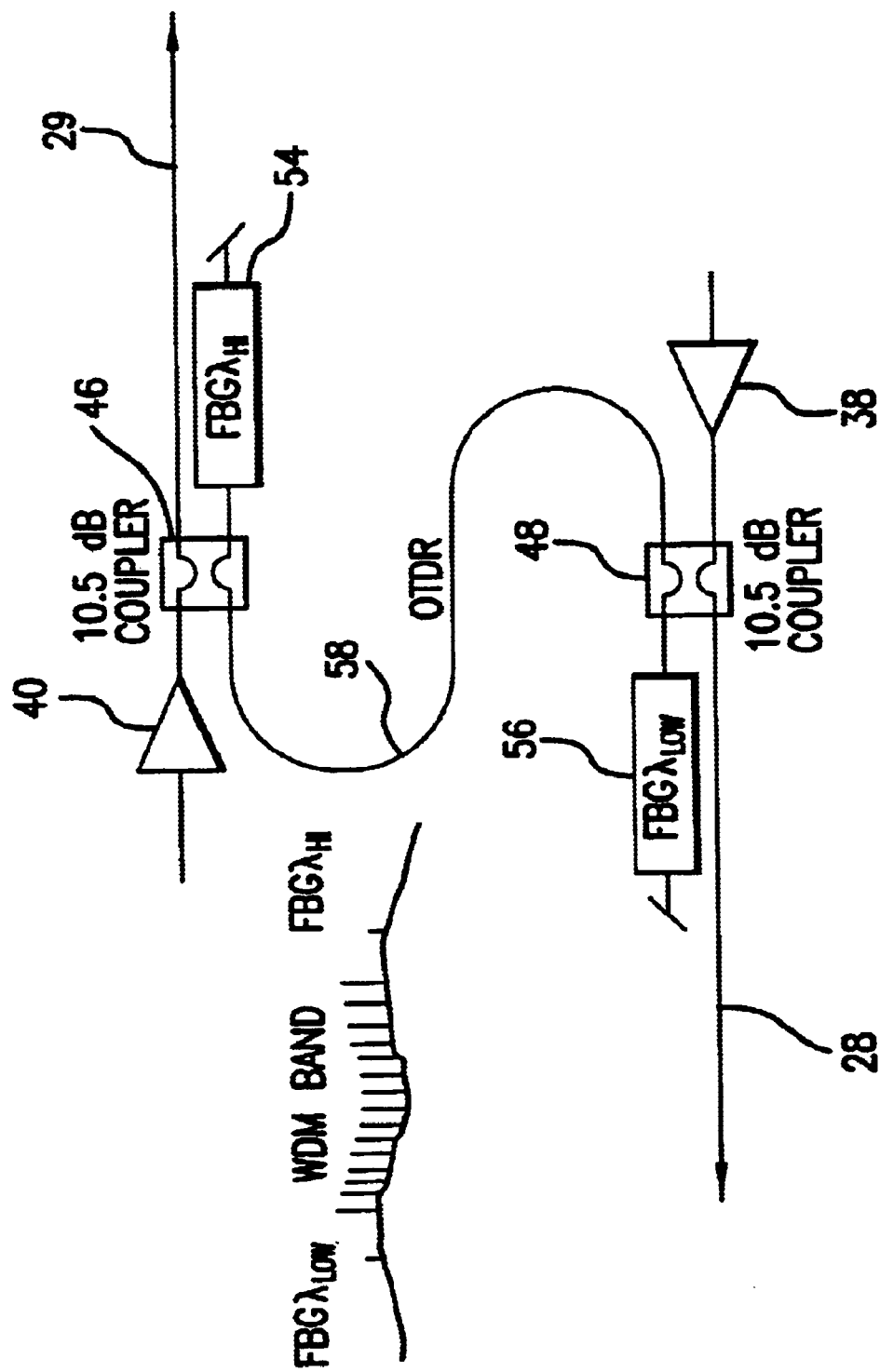
FIG. 2 shows an alternative embodiment of the monitoring system shown in FIG. 1.

FIG. 2 shows an alternative embodiment of the invention in which a single loop-back path 58 is used for coupling both the LME tone and the OTDR signal to the opposite-going transmission path. In FIGS. 1 and 2, like reference numerals refer to like elements. Rather than the transmissive filters 41 and 43 employed in FIG. 1, however, in FIG. 2 reflective filters 54 and 56 are used. Reflective filters 54 are 56 reflect the LME tone and pass all other wavelengths into a non-reflective termination device. For example, if the LME tone on optical fiber 29 is located at a wavelength $\lambda_{hi}$ that is greater than the wavelengths of the data channels, reflective filter 54 will only reflect $\lambda_{hi}$ back along loop-back path 58. Likewise, if the LME tone on optical fiber 28 is located at a wavelength $\lambda_{low}$ that is less than the wavelengths of the data channels, reflective filter 56 will only reflect $\lambda_{low}$ back along loop-back path 58.

In operation, coupler 46 receives the LME tone directed along optical fiber 29 and couples it to reflective filter 54, which in turn reflects the LME tone along loop-back path 58 so that it is coupled to optical fiber 28 by coupler 48. Coupler 46 also receives the backscattered signal from optical fiber 29 and couples it to loop-back path 58 so that it can be coupled to optical fiber 28 by coupler 48. Coupler 48 receives the LME tone directed along optical fiber 28 and couples it to reflective filter 56, which in turn reflects the LME tone along loop-back path 58 so that it is coupled to optical fiber 29 by coupler 46. Coupler 48 also receives the backscattered signal from optical fiber 28 and couples it to loop-back path 58 so that it can be coupled to optical fiber 29 by coupler 46.

The reflective filters 54 and 56 may be formed from any appropriate device such as a fiber Bragg grating, for example. Other devices that may be employed include thin film reflectors.

What is claimed is:

1. An optical communication system, comprising:
   first and second optical transmitters/receivers remotely located with respect to one another;
   first and second optical transmission paths coupling said first transmitter/receiver to said second transmitter/receiver for bidirectionally transmitting optical information therebetween;
   first and second optical amplifiers respectively disposed in said first and second optical transmission paths;
   at least one loop-back path optically coupling a portion of a WDM optical signal from the first to the second transmission path, said loop-back path including a filter for transmitting a monitoring channel but not a data channel included in said optical signal portion.

2. The system of claim 1 further comprising an OTDR path for coupling a backscattered signal from the first to the second transmission path.

3. The system of claim 2 wherein said loop-back path includes first and second optical couplers disposed in said first and second transmission paths, respectively.

4. The system of claim 3 wherein said loop-back path and said OTDR path overlap at least in part and said first and second couplers further couple said backscattered signal from the first to the second transmission path.

5. The system of claim 4 further comprising third and fourth optical couplers for coupling said optical signal portion to said overlapping portion of the OTDR path.

6. The system of claim 4 wherein said WDM optical signal includes a plurality of data channels occupying a data bandwidth and wherein said monitoring channel is located at a wavelength outside said data bandwidth.

7. The system of claim 3 further comprising a second loop-back path optically coupling a second portion of a WDM optical signal from the second to the first transmission path.

8. The system of claim 7 wherein said second loop-back path includes a second filter for transmitting therethrough a monitoring channel but not a data channel included in said second optical signal portion.

9. The system of claim 8 wherein said second loop-back path includes said first and second optical couplers.

10. The system of claim 7 wherein said filter is a fiber Bragg grating reflecting the monitoring channel.

11. The system of claim 10 wherein said first and second loop-back paths employ a common optical fiber coupled to said first and second optical couplers and further comprising a second fiber Bragg grating reflecting a second monitoring channel employing a wavelength different from said monitoring channel.

12. The system of claim 11 wherein said monitoring channel is located at a wavelength above said data channel.

13. The system of claim 12 wherein said second monitoring channel is located at a wavelength below said data channel.

14. The system of claim 1 wherein said WDM optical signal includes a plurality of data channels occupying a data bandwidth and wherein said monitoring channel is located at a wavelength outside said data bandwidth.

15. The system of claim 14 wherein said monitoring channel is located at a wavelength below said data bandwidth.

16. The system of claim 14 wherein said monitoring channel is located at a wavelength above said data bandwidth.

17. The system of claim 1 wherein said filter is a transmissive filter.

18. The system of claim 1 wherein said filter is a reflective filter.

19. The system of claim 18 wherein said reflective filter is a fiber Bragg grating reflecting the monitoring channel.

20. An optical repeater for use in an optical communication system, comprising:
   first and second optical amplifiers each having an input and output for arrangement at an intermediate point along first and second optical transmission paths, respectively, the optical transmission paths coupling first and second transmitters/receivers for bidirectionally transmitting optical information therebetween;
   at least one loop-back path optically for coupling a portion of a WDM optical signal from the first to the second transmission path, said loop-back path including a filter for transmitting a monitoring channel but not a data channel included in said optical signal portion.

21. The repeater of claim 20 further comprising an OTDR path for coupling a backscattered signal from the first to the second transmission path.

22. The repeater of claim 21 wherein said loop-back path includes first and second optical couplers disposed in said first and second transmission paths, respectively.

23. The repeater of claim 22 wherein said loop-back path and said OTDR path overlap at least in part and said first and second couplers further couple said backscattered signal from the first to the second transmission path.

24. The repeater of claim 23 further comprising third and fourth optical couplers for coupling said optical signal portion to said overlapping portion of the OTDR path.

25. The repeater of claim 23 wherein said EM optical signal includes a plurality of data channels occupying a data bandwidth and wherein said monitoring channel is located at a wavelength outside said data bandwidth.

26. The repeater of claim 22 further comprising a second loop-back path optically coupling a second portion of a WDM optical signal from the second to the first transmission path.

27. The repeater of claim 26 wherein said second loop-back path includes a second filter for transmitting therethrough a monitoring channel but not a data channel included in said second optical signal portion.

28. The repeater of claim 27 wherein said second loop-back path includes said first and second optical couplers.

29. The repeater of claim 26 wherein said filter is a fiber Bragg grating reflecting the monitoring channel.

30. The repeater of claim 29 wherein said first and second loop-back paths employ a common optical fiber coupled to said first and second optical couplers and further comprising a second fiber Bragg grating reflecting a second monitoring channel employing a wavelength different from said monitoring channel.

31. The repeater of claim 30 wherein said monitoring channel is located at a wavelength above said data channel.

32. The repeater of claim 31 wherein said second monitoring channel is located at a wavelength below said data channel.

33. The repeater of claim 20 wherein said WDM optical signal includes a plurality of data channels occupying a data bandwidth and wherein said monitoring channel is located at a wavelength outside said data bandwidth.

34. The repeater of claim 33 wherein said monitoring channel is located at a wavelength below said data bandwidth.

35. The repeater of claim 33 wherein said monitoring channel is located at a wavelength above said data bandwidth.

36. The repeater of claim 20 wherein said filter is a transmissive filter.

37. The repeater of claim 20 wherein said filter is a reflective filter.

38. The repeater of claim 37 wherein said reflective filter is a fiber Bragg grating reflecting the monitoring channel.

39. A method for monitoring an optical communication system that includes first and second optical transmission paths coupling a first transmitter/receiver to a second transmitter/receiver for bidirectionally transmitting optical information therebetween, said first and second optical transmission paths respectively including first and second optical amplifiers, said method comprising the steps of:

transmitting a WDM signal that includes a monitoring channel and at least one data channel through the first optical transmission path;

coupling a portion of the WDM optical signal from the first transmission path;

filtering said WDM optical signal portion for transmitting the monitoring channel but not the data channel;

coupling said filtered portion of the WDM optical signal to the second transmission path;

detecting said monitoring channel.

40. The method of claim 39 further comprising the step of coupling a backscattered signal from the first to the second transmission path over an OTDR path.

41. The method of claim 40 wherein said coupling step is performed by a loop-back path that includes first and second optical couplers disposed in said first and second transmission paths, respectively.

42. The method of claim 41 wherein said loop-back path and said OTDR path overlap at least in part and said first and second couplers further couple said backscattered signal from the first to the second transmission path.

43. The method of claim 42 further comprising third and fourth optical couplers for coupling said optical signal portion to said overlapping portion of the OTDR path.

44. The method of claim 43 wherein said filtering step is performed by a fiber Bragg grating reflecting the monitoring channel.

45. The method of claim 42 wherein said WDM optical signal includes a plurality of data channels occupying a data bandwidth and wherein said monitoring channel is located at a wavelength outside said data bandwidth.

46. The method of claim 41 further comprising a second loop-back path optically coupling a second portion of a WDM optical signal from the second to the first transmission path.

47. The method of claim 44 wherein said second loop-back path includes a second filter for transmitting therethrough a monitoring channel but not a data channel included in said second optical signal portion.

48. The method of claim 45 wherein said second loop-back path includes said first and second optical couplers.

49. The method of claim 39 wherein said WDM optical signal includes a plurality of data channels occupying a data bandwidth and wherein said monitoring channel is located at a wavelength outside said data bandwidth.

50. The method of claim 49 wherein said monitoring channel is located at a wavelength below said data bandwidth.

51. The method of claim 49 wherein said monitoring channel is located at a wavelength above said data bandwidth.

52. The method of claim 39 wherein said filtering step is performed by a transmissive filter.

53. The method of claim 39 wherein said filtering step is performed by a reflective filter.

54. The method of claim 53 said reflective filter is a fiber Bragg grating reflecting the monitoring channel.

* * * * *